(12) United States Patent
Peercy et al.

(10) Patent No.: US 8,296,763 B1
(45) Date of Patent: Oct. 23, 2012

(54) SYSTEM AND METHOD FOR PERSONAL CLOUD COMPUTING

(75) Inventors: Mark S. Peercy, Cupertino, CA (US); Danny D. Loh, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 623 days.

(21) Appl. No.: 12/475,247

(22) Filed: May 29, 2009

(51) Int. Cl.
*G06F 9/455* (2006.01)
*H04L 29/06* (2006.01)
(52) U.S. Cl. .............................. 718/1; 713/164; 713/161
(58) Field of Classification Search ...... 718/1; 713/161, 713/164
See application file for complete search history.

(56) References Cited

U.S. PATENT DOCUMENTS

| 2007/0101275 | A1 | 5/2007 | Della-Porta | |
| 2008/0046581 | A1* | 2/2008 | Molina et al. | 709/229 |
| 2008/0059897 | A1 | 3/2008 | Dilorenzo | |
| 2008/0244569 | A1* | 10/2008 | Challener et al. | 718/1 |
| 2010/0011358 | A1* | 1/2010 | Kettler et al. | 718/1 |
| 2011/0029974 | A1* | 2/2011 | Broyles et al. | 718/1 |

OTHER PUBLICATIONS

David Chappell, "A short introduction to cloud platforms," Article retrieved from Internet, Aug. 2008, http://www.davidchappell.com/CloudPlatforms--Chappell.pdf.
Tonido Media presentation, From tonido.com website http://www.codelathe.com/blog/index.php/2009/01/31/announcing-tonido/, Jan. 31, 229.

* cited by examiner

*Primary Examiner* — Thomas Lee
*Assistant Examiner* — Terrell Johnson
(74) *Attorney, Agent, or Firm* — Robert C. Kowert; Meyertons, Hood, Kivlin, Kowert & Goetzel, P.C.

(57) ABSTRACT

A system and method for providing Personal Cloud computing and for hosting applications and/or content may employ a network attached storage device on which virtual machine monitors (T-cups) and logical devices (Ts) are instantiated in memory. Each T may include hosted content, application modules, a server module configured to host the modules and/or content, and an interface module configured to provide access to the modules and/or content in response to detecting an authorized key. Detecting an authorized key may include communicating with a name server to determine if a T instantiated on a storage device coupled to the system is associated with a device identifier on a list of device identifiers authorized to access the module(s). The storage device may be a computer, camera, frame, phone, audio/video player, or portable storage device. The name server may be configured to authenticate Ts, define T ownership, and/or establish friend-to-friend networks between Ts.

24 Claims, 9 Drawing Sheets

SYSTEM AND METHOD FOR PERSONAL CLOUD COMPUTING

BACKGROUND

Description of the Related Art

The computing, information, and communication industries are undergoing a massive transition with the rise of low-cost, high-performance devices, high-bandwidth communication infrastructure, and the Internet. The personal computer (PC), once a stalwart of information technology, is in rapid retreat, its value being drained away by innumerable large and small players offering solutions to problems that overlap the offerings of the PC and often extend well beyond them. Unfortunately, although users have been offered a dramatically wider array of options than before, it has come at a very real cost: data and applications are fragmented across heterogeneous and often incompatible devices and the Internet, device management has become extraordinarily complicated, and devices and Internet services come and go at an astonishing rate. Chores that were complicated for some users, even when they had just one PC to manage, have become significantly more difficult.

Cloud computing promises to alleviate these issues by restructuring the way that users engage with their information. With cloud computing, instead of installing and maintaining applications on every device in order to interact with data that may be spread across one or more of those devices, data is encapsulated in applications that are hosted as services on servers and delivered from those servers to the devices as clients. Typically, cloud computing services in the "public cloud" are hosted on the Internet, managed and maintained by third-party providers. The equivocation between data and applications in cloud computing mitigates the heterogeneity problem by using Internet communication and protocol standards, which can be supported on almost all connected devices, to provide services at any time and any place. It also mitigates the sustainability and maintainability problems by allowing its services to be amended, upgraded, and augmented by the service provider with minimal demands on the client.

Private clouds, becoming in vogue in the enterprise arena, are currently targeted at the data center, with scalable servers running heavyweight applications and handling massive amounts of data. These servers may scale to extremely large numbers of simultaneous users while running applications in one-to-many or many-to-many topologies. The private cloud reinforces a thin client-thick server usage model, where inter-device sharing pivots through the cloud. As a result, the private cloud (like the "public" cloud) has a strong asymmetry between client devices and the cloud infrastructure, and it requires expertise to manage both the devices and the cloud. Rather than having corporate data and applications residing on servers maintained and hosted by a third party, this model simplifies the process of building "clouds" to a point that the cloud computing infrastructure can be assembled and managed by a business's internal IT team. Private clouds can be constructed to interoperate with the public cloud, for example to balance loads during peak utilization.

SUMMARY

A system and method for providing Personal Cloud computing and for hosting applications and/or content may in some embodiments employ a network attached storage device on which various logical devices and virtual machine monitors may be instantiated in memory. Each of the logical device instances, referred to herein as "Ts" may be created by one of the virtual machine monitors, referred to herein as "T-cups." Each executable logical device instance may in various embodiments include hosted content, one or more application modules (e.g., a root module, one or more other core modules, and one or more user modules), a server module (e.g., a Flash® Media server) configured to host the one or more application modules and the hosted content, and an interface module (e.g., a Flash® player) configured to provide access to the one or more application modules and/or hosted content in response to detecting an authorized key. In some embodiments, the hosted content may be accessible only by one of the hosted applications. In some embodiments, the hosted content and hosted applications may be resident in local storage allocated to the corresponding T.

In some embodiments detecting an authorized key may include detecting that a storage device is coupled to the system and determining that a logical device (e.g., a second T) instantiated in memory on the storage device is associated with a device identifier included on a list of device identifiers authorized to access the application module(s). In some embodiments determining that the second T is associated with a device identifier included on a list of device identifiers authorized to access the application module(s) may include communicating with a name server coupled to the system and configured to maintain such a list of device identifiers. The list of device identifiers may in some embodiments indicate an association between each device and the modules each device is authorized to access and/or may include information indicating an ownership group to which each device belongs, a space that the device is authorized to access, and/or other authorization information associated with the device.

In various embodiments, the storage device serving as a key may comprise a computer system, a digital camera, a digital photo frame, a mobile phone, an audio player, a video player, an installed storage device, or a portable storage device. The storage device may in some embodiments, and in some cases, belong to an owner of the logical device that includes the application module(s) to which access is sought. In this case, the storage device may serve as an owner key. In other embodiments, and/or in other cases, the storage device may belong to a guest of an owner of the logical device that includes the application module(s) to which access is sought.

In some embodiments, the second T may include one or more other application modules (e.g., another root module, one or more other core modules, and one or more other user modules), another server module (e.g., a Flash® Media server) configured to host the one or more other application modules, and another interface module (e.g., a Flash® player) configured to provide access to the one or more other application modules in response to detecting a key configured to enable access to the one or more other application modules.

In some embodiments, the network attached storage device (sometimes referred to herein as an "Iron") and/or various storage devices serving as keys may be configured to communicate with a name server (sometimes referred to herein as a "switchboard") in order to authenticate Ts, define T ownership, and/or establish friend-to-friend networks between Ts. For example, each T may include a list of contacts, each representing another T, and a given T may be configured to send a request to connect to a second T represented on its list of contacts to the switchboard. If the given T is included on the contact list of the second T, the switchboard may be configured to return location information associated with the second T to the given T. In response to receiving the location information from the name server, the given T may be configured to establish a direct communication channel between its server module and a server module of the second T.

In various embodiments, the methods described herein may be implemented as program instructions, (e.g., stored on computer-readable storage media) executable by one or more CPUs and/or GPUs. For example, they may be implemented as program instructions that, when executed, implement a switchboard, a virtual machine monitor (T-cup), a logical device (T), a server module, an interface module, various hosted applications, or other components of the system described herein to provide Personal Cloud computing.

Figure 1:
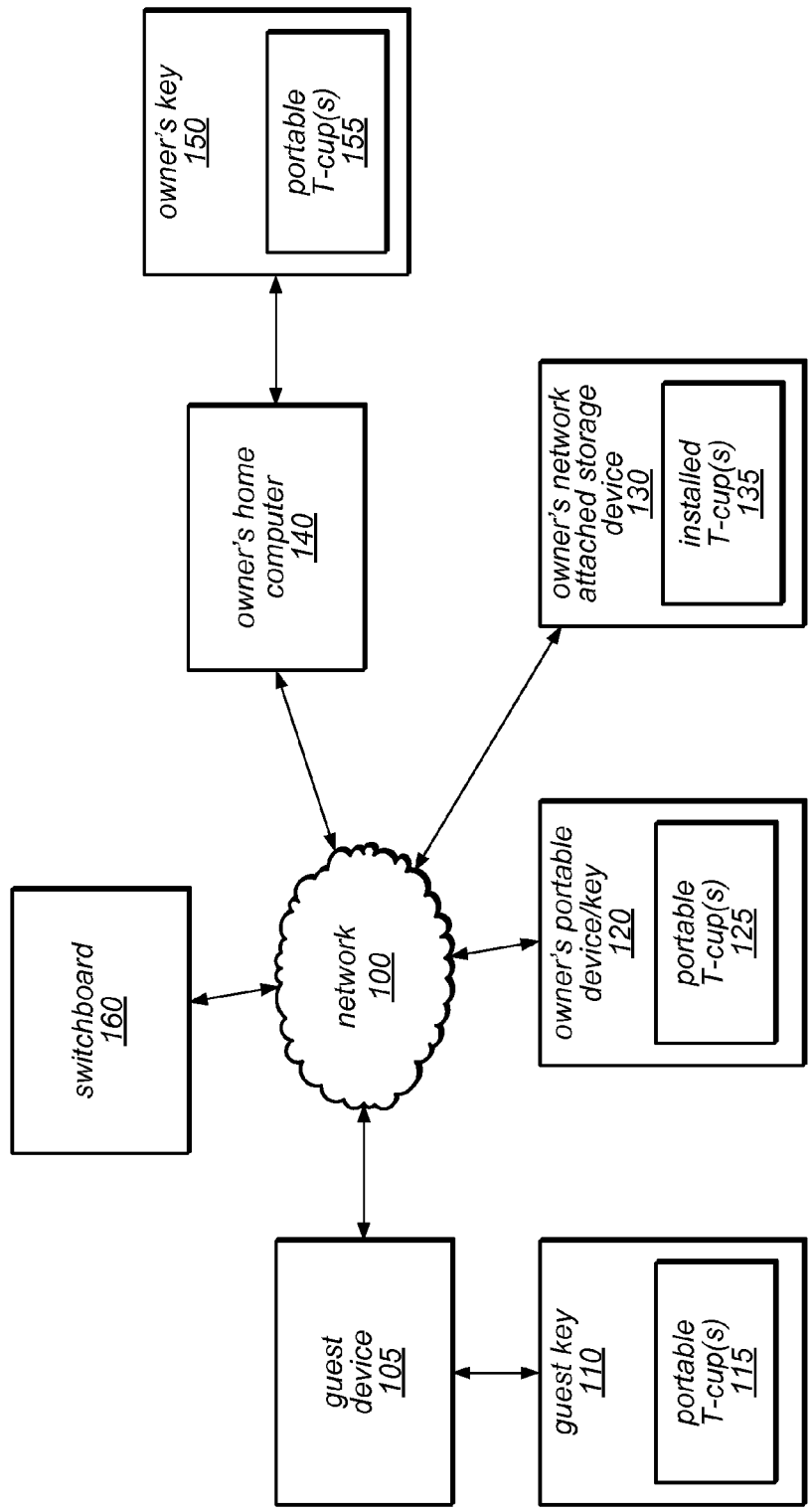
FIG. 1 is a block diagram illustrating a system configured to support Personal Cloud computing, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, the demands of users today to manage, experience, interact with, and share data and applications on devices in their possession are enormous. Cloud computing may alleviate some of these issues by restructuring the way that users engage with their information. As described above, in public cloud computing, data may be encapsulated in services that are hosted on servers and delivered to the devices as clients. Typically, these cloud services are hosted on the Internet and maintained by third-party providers. However, this division of responsibility between users and third parties may not be intrinsic to cloud computing. Instead, the system and methods described herein for providing Personal Cloud computing may be based in part on the recognition that a user's decision to transition to the cloud (with its restructuring of user applications, data, and workflows) may be independent from their decision about who possesses and maintains the hosted services, and where. In other words, each of these separable decision points may come with their own perceived costs and benefits, these decisions need not be made concurrently.

In some embodiments, the system and methods described herein may enable users to operate their own Personal Cloud computing infrastructure and services. As a result, users may make the transition to cloud computing without relinquishing control of their data and applications to third party providers. In some embodiments, it may also provide a solution for users who are unprepared to simultaneously restructure their workflows and relinquish control to third parties. For these users, the Personal Cloud may be seen as a way to transition them into the (public) cloud in two discrete steps. In other words, in some embodiments, the Personal Cloud may meet these users where they are, transition them to cloud computing, and enable them to seamlessly engage with services hosted by third parties on the Internet if, and when, they are ready.

The system and methods for providing Personal Cloud computing described herein may in some embodiments enable users to establish friend-to-friend trusted networks (and define spaces within those networks), and to author, host, serve, and consume applications (e.g., Adobe® Flash® applications) across them. In various embodiments, the Personal Cloud may package cloud computing infrastructure and applications together in a form that enables users to maintain their own services on their own devices. If desired, these services may be designed to seamlessly interoperate with others hosted on the Internet. In contrast to the public cloud or the private cloud model, the Personal Cloud may be designed for few-to-few communication, where the infrastructure needs to support only a relatively small number of users simultaneously and the server side applications may not be extremely resource intensive. As a result, the thin client-thick server dichotomy may be eliminated. Instead, in some embodiments, the server in the Personal Cloud may be lightweight enough to be integrated with the client, effectively homogenizing the entire network. A fundamental consequence of introducing homogeneity into the network may be that communication can shift from client-server to peer-to-peer. Or, in the case of the Personal Cloud, the network may represent friend-to-friend communication channels. For example, in some embodiments, users may explicitly associate devices with one another. In some embodiments, any device may be able to serve selected content and/or applications (using a cloud-computing mechanism) to any other device with which it has formed a trusted relationship.

While the Personal Cloud may homogenize the way that devices establish friend-to-friend networks and the way applications are served and consumed within those networks, the choice of how to configure devices, including which applications to host on which devices, may be dependent on the particular problem that is being addressed. As described in more detail herein, the Personal Cloud software stack may consists of "T-cup", one or more "Ts" hosted by T-cup, and applications that are served by those Ts. This stack (or select portions thereof) may be deployed in various different ways, including: installed, portable, hosted, or as a service.

As is common with software applications, the Personal Cloud stack may some embodiments simply be installed on a device at manufacturing time (i.e. bundled with the device) or after-market using a standard installation mechanism (e.g., using electronic software distribution, or shrink-wrapped). In this type of deployment, the software may be seen as extending the feature set of the device on which it is installed. It may coexist with other native applications that are executing simultaneously on that device. In cases in which the Personal Cloud is the only software accessible to a user, however, it may define the entire feature set of the device.

In other embodiments, instead of being installed directly on a device, the Personal Cloud software stack may be deployed as a portable application. Portable applications are software programs that can be executed on a computer without installation and whose side effects (such as file modifications) are confined to the package that contains the application itself. When distributed on an external storage device, such as a USB thumb drive, and executed directly from that device, a portable application may leave a computer in exactly the same state it was before the application ran. In embodiments in which the Personal Cloud software is deployed as a portable application, users may temporarily make any compatible device behave as if it is their own device by executing their (portable) T-cup and corresponding Ts on the device. In such embodiments, the device may be left unmodified after the user finishes their tasks.

In some embodiments, the Personal Cloud software may be deployed through a hosting service on the Internet. In such embodiments, service providers may (conceptually) execute T-cup instances, which host Ts for individual users. In this deployment, the Ts in the cloud may behave just like local Personal Cloud devices, with the same user mechanisms for device and data management and the same relationships and interactions as a peer. In such embodiments, to an end user, a hosted T may be just another device they maintain.

Yet another deployment option may be to offer only the T applications themselves as a hosted service. In this model, the service provider may (conceptually) maintain both the infrastructure and the Ts, and users may engage with the applications and data alone. In such embodiments, to a user, the experience may be substantially similar to the experience they receive with hosted services as currently delivered in the public cloud.

A central value proposition of public cloud computing is "any time, any place" access to data and applications. This enables centralization of services with a hub-and-spoke communication model, where information is maintained on a server that can be reached by clients whenever they please. The server, therefore, must always be on, connected to the network with a known route, and capable of storing and serving the corresponding data and applications. Clients, on the other hand, need only be on and connected when their users need to access and engage with the information located on the server.

The system and methods described herein for providing a Personal Cloud may in some embodiments also rely on this "any time, any place" usage model. In such embodiments, the lowest common denominator for this offering may be a network attached storage (NAS) device hosting a T and using a switchboard as a name server to inform trusted Ts of its location. A NAS used as an always-on, personal application server may be known, in such Personal Cloud embodiments, as an "Iron." In some embodiments, this NAS may always be in the possession of the user (i.e. its owner). In other embodiments, rather than a NAS being in the possession of a user, the same device may be hosted by a service provider on the Internet. The Ts on a "Hosted Iron" may still be maintained by the owner of the Ts, in such embodiments. However, the hardware and T-cup software may be maintained by the service provider. In such embodiments, Ts on Hosted Irons may behave exactly as their local counterparts.

Because the Personal Cloud assumes only a limited number of trusted clients, in some embodiments it may be possible to relax the always-on constraint of Iron. The server may only have to be on and connected when clients need to access it, and the user that maintains the server may have enough information (through sideband communication) to know when this is required. In this case, it may be possible to deploy the Personal Cloud software stack as a "Soft Iron," which may comprise the same software as Iron deployed on another device. In various embodiments, a Soft Iron may be deployed on a personal computer, or, in principle, on any capable device.

As previously noted, the system described herein for providing a Personal Cloud may in some embodiments include various combinations of three primary components: a logical device (T) for encapsulating content and for serving and consuming applications and services; a virtual machine monitor (T-cup) for creating, destroying, and hosting Ts on local, physical devices and for administering Ts on both local and remote physical devices; and a T name server (switchboard) for T authentication and matchmaking.

In some embodiments, hardware "keys," such as USB flash drives, may be employed to provide a (near) zero-configuration solution for remote access by the owner, both inside and outside of the home, as well as sharing with friends and family. In some embodiments, "soft keys" may also be installed on PCs inside the home to enable local access of an owner's Iron without the need for another physical device.

FIG. 1 illustrates a system configured to support a user's Personal Cloud, according to one embodiment. In this example, the system includes a home computer 140 belonging to the user (referred to in this example as the "owner"). In this example, the owner's home computer is connected to a network 100 (e.g., the Internet). As illustrated in FIG. 1, the system may include a network attached storage device 130 belonging to the owner. In this example, it is network attached storage device 130 that may host the owner's applications and corresponding managed file systems (e.g., photos, financial data, etc.). As illustrated in FIG. 1, the owner's network attached storage device 130 (i.e. the owner's Iron) may include one or more installed T-cup instances 135. As illustrated in FIG. 1, the system may include an owner's key 150, which may include one or more portable T-cup instances 155. In some embodiments, the owner's key 150 may be a hardware device (e.g., a USB drive), while in other embodiments, owner's key 150 may be a soft key installed on the owner's home computer 140. In this example, the system may also include a portable device 120 (e.g., a mobile phone or digital camera) belonging to the owner, which may also serve as an owner key. These portable devices 120 may include one or more portable T-cup instances 125.

As described in more detail below, the owner's key 150 and/or the owner's portable device(s) 120 may be used by the owner to access and manage the owner's applications and corresponding file systems on network attached storage device 130 and/or to perform various administrative tasks for the owner's Personal Cloud, such as registering various Ts with switchboard 160, claiming ownership of various Ts, or establishing lists of contacts (friends and/or their Ts) that may access the owner's applications and/or data.

As described herein, a system implementing a Personal Cloud may in some embodiments be configured to allow friends of the owner to access the owner's applications and/or corresponding file systems. As illustrated in FIG. 1, such a system may include a guest device 105 connected to network 100 (e.g., a personal computer or portable device belonging to a friend of the owner connected to the Internet). In this example, the system may also include a guest key 110, which may include one or more portable T-cup instances 115. As described in more detail herein, the friend may be able to access the owner's network attached storage device 130, and the applications and/or file systems hosted on that device, by establishing a connection between guest device 105 and the owner's network attached storage device 130. As illustrated in FIG. 1, the system may include a switchboard 160, through which the Ts of an owner's friends may request such a connection. The functionality of T-cups 115, 125, 135, and 155, and the functionality of switchboard 160 are described in more detail below.

In the system described herein, a T is a logical device with persistent storage that may hold a) media, documents, and other data assets of the user; b) system-level and user-generated T applications and services; and c) contact information for other trusted Ts. In various embodiments, all of this content may accessed, managed, and experienced exclusively through one or more of the resident T applications or services executing in an operating environment on the T. The T operating environment may present its device as a single-user system known as the T owner. In such a single-user system, all content on a T (e.g., media, documents, data, modules, and contacts) may be owned by the owner of that T. In contrast, a guest of a T may be an owner of one or more other Ts that have been given access to the first T by its owner. In some embodiments, the operating environment may grant or restrict the privileges of guests, as specified by the owner through the different types of T applications and services.

Conceptually, a T may be thought of as containing local storage (e.g., a logical partition mapped to a portion of physical storage carved out from the physical storage on the device, similar to that employed by a virtual machine running in some systems today). The applications hosted by the T may reside in this local storage, as does any user data (i.e. managed content) hosted by the T. The user data hosted on a T may in some embodiments be accessed only via one or more of the applications hosted on the T.

In some embodiments, a T application may be executable code that has private, persistent storage known as a file system instance. Applications may be written in various languages, in different embodiments. In one embodiment, applications may be written in Adobe® ActionScript®, using the set of Adobe Flex® developer tools. In some embodiments, to utilize services within the Personal Cloud, such as accessing assets stored on a T and sharing with other devices, these applications may adhere to a set of application programming interfaces (e.g., with ActionScript bindings), to the T operating environment. In some embodiments, a "T service" may be identical to a T application, with the exception that it may not have its own file system instance. Rather, a service may inherit the file system instance of the application or service from which it was invoked. In various embodiments, data in a file system instance may only be accessed or modified by its corresponding application or by a service that has inherited the file system instance. An application or service may be generally referred to herein as a "module." In some embodiments, every module on a T may be of one of three types: core, user, or privileged.

In some embodiments, core modules may have access to all features exported by the T operating environment. In some embodiments, only core modules can create and destroy content on the T, and only they can change the settings and content permissions of privileged and user modules. In some embodiments, every T may have a unique core module, known as the "root module," that serves as a public interface to interoperate with its T-cup (which may invoke the root module as an application) and other Ts (which may invoke the root module as a service). The root module may differ from T to T, but it may ultimately be responsible for exporting functionality that is appropriate for the owner of that T. This may include, for example, providing the ability to launch other core modules to manage content on the T or to view privileged modules on Ts owned by others.

In contrast to core modules, user modules may have access to only a limited set of features exported by the operating environment. These may include, for example, the ability the read, modify, and/or write their associated file system instance. In some embodiments, user modules may be able to access (but not modify) content only on the T that has been explicitly specified by a core module. In some embodiments, if a user module wants to give users the ability to make changes to content, it may make a copy of the content in its own file system instance. At that point, a user can do anything they want to the copy. In some embodiments, an updated, private copy can only be moved back into the content of the T by a core application. If the copy resides only in the file system instance of the user module, it may not be accessible by any other modules on the T.

Privileged modules may enable the sharing of content on a T with owners of other, trusted Ts (i.e. guests). They may be identical to user modules with two exceptions. First, every privileged module may include a "white list" of contacts that enumerates all guests that are granted permission to execute the privileged module. Such white lists may serve to define spaces within a personal network that limit access to privileged modules (e.g., a space restricted to family, another restricted to co-workers or club members, etc.). In some embodiments, the white list may only be populated or modified by a core module. In some embodiments, if a friend-to-friend network has been successfully established between Ts, a core module running on one of the Ts may ask its operating environment to provide a list of all privileged modules that are accessible to it (i.e. by virtue of being on the white lists of those modules) on all of the Ts in the network. In some embodiments, any of those privileged modules may, in turn, be executed by that core module or by any other core module that has been given a handle to the privileged module, as described in more detail below. The second way that privileged modules may differ from user modules is that privileged modules may execute a set of user modules on the T that have been explicitly identified by a core module. By extension, a guest of a privileged module may execute the user modules that are available to the privileged module, in some embodiments.

The T operating environment may in some embodiments comprise a Flash® Player, either as a standalone client or part of Adobe® Integrated Runtime (AIR); an embedded Flash® Media Server (FMS); and extensions to the FMS JavaScript™ engine to manage switchboard interactions, access native services through T-cup, and enforce execution permissions of owners and guests. The Flash Player instance on each T may establish a connection with the corresponding FMS on that T (i.e. its localhost), and all client communication may pass through the local FMS. In some embodiments, for remote access, the switchboard may provide location information (e.g. IP addresses) of friend devices to one another, and the T operating environments may open a connection (e.g., a NetConnection) between the corresponding FMS instances. Flash executables (such as Shockwave® Flash executables, or SWFs) and assets may be served by FMS across this connection when requested from clients.

As described herein, the Personal Cloud is designed to be deployed on a broad collection of devices, ranging from PCs to cameras to digital photo frames to network-attached storage devices. Therefore, in some embodiments, it may be lightweight enough to run on embedded processors, e.g., by employing an embeddable version of FMS. In such embodiments, the embedded FMS may execute in a single process.

In some embodiments, every T may have an associated alphanumeric string, known as its T ID, which serves as a worldwide, unique identifier. In various embodiments, a T ID may be created through a dedicated hosted service when the T itself is created, either during the manufacturing process or after market. To resist spoofing, creation of a T ID may typically be a function of a unique characteristic of the physical device on which the logical T is running. For example, in some embodiments, the T ID may be derived from the serial number of the hard disk on which the T is installed. The primary purpose of T identifiers may be to act as handles, like phone numbers, that users may exchange to introduce Ts to one another in order to form friend-to-friend networks. As such, T IDs may be designed to be transmitted in the clear.

As previously noted, a T-cup is a virtual machine monitor for creating, destroying, and hosting Ts on a physical device. In various embodiments, a T-cup may be a native application, with permissions inherited from the operating environment of the physical device on which it is executed. In some embodiments, Ts cannot exist outside the confines of a T-cup, and every T may be maintained by one and only one T-cup. All Ts that are managed by a T-cup are said to be "local: to the T-cup. Ts that are maintained by other T-cups are said to be "remote" to the T-cup. In addition to its role as a virtual machine monitor, T-cup may also enable users to administer and engage with all of the Ts they own, both local and remote. In some embodiments, multiple users may share a single physical device because multiple T-cups, each with its own Ts, may be executing simultaneously on a single physical device. As a result, some remote Ts may not actually reside on remote physical devices, but merely within other T-cups.

In some embodiments, a T-cup may employ the facilities of the native operating environment of the physical device, as needed, to create a new T. This may include allocating space on the physical device for the dedicated, persistent storage that is associated with the new T. It may also include the creation of the new T ID, based on a property of the physical device, with the help of a service hosted on the Internet. When a T is created, it may be recognized by T-cup as a local T that is unclaimed. Conversely, when a T is destroyed using T-cup, its allocated resources may be returned to the physical device, and the T ID may no longer be active in the Personal Cloud infrastructure.

As described herein, a T-cup may be responsible for hosting Ts as they operate. In this capacity, a T-cup may export all necessary facilities of the native operating environment to every T that it hosts. This may include, for example, access to the native file system, local printers, and local cameras.

In some embodiments, content on a T may typically be created, destroyed, and managed through core modules on the T. There may be times, however, when users may wish to manage content holistically across all of the Ts they own. In some embodiments, every T may enable a user to export and import content to the physical device on which it is running. In such embodiments, therefore, it may always be possible for a user to migrate content from T to T as two-step process. At times, however, it may be desirable to manage content in one location. T-cup may be responsible for this kind of activity, implementing any services that allow content to migrate across devices in an centralized way. Such services may include, for example, tools to migrate, copy, backup, and synchronize content from one T to another.

In various embodiments, a T-cup may enable a user to engage with any local, remote, or visible unclaimed Ts. The mechanism to "enter in" to a given T may include the T-cup executing the root application of that T. The root application may be required to provide a path for the owner to all of the relevant functionality of the T. The T-cup may be responsible for rendering the root applications of Ts on the physical device, and it may enable the user to transition between root applications of different Ts. In this way, owners may engage with all of the Ts in their control.

Figure 2:
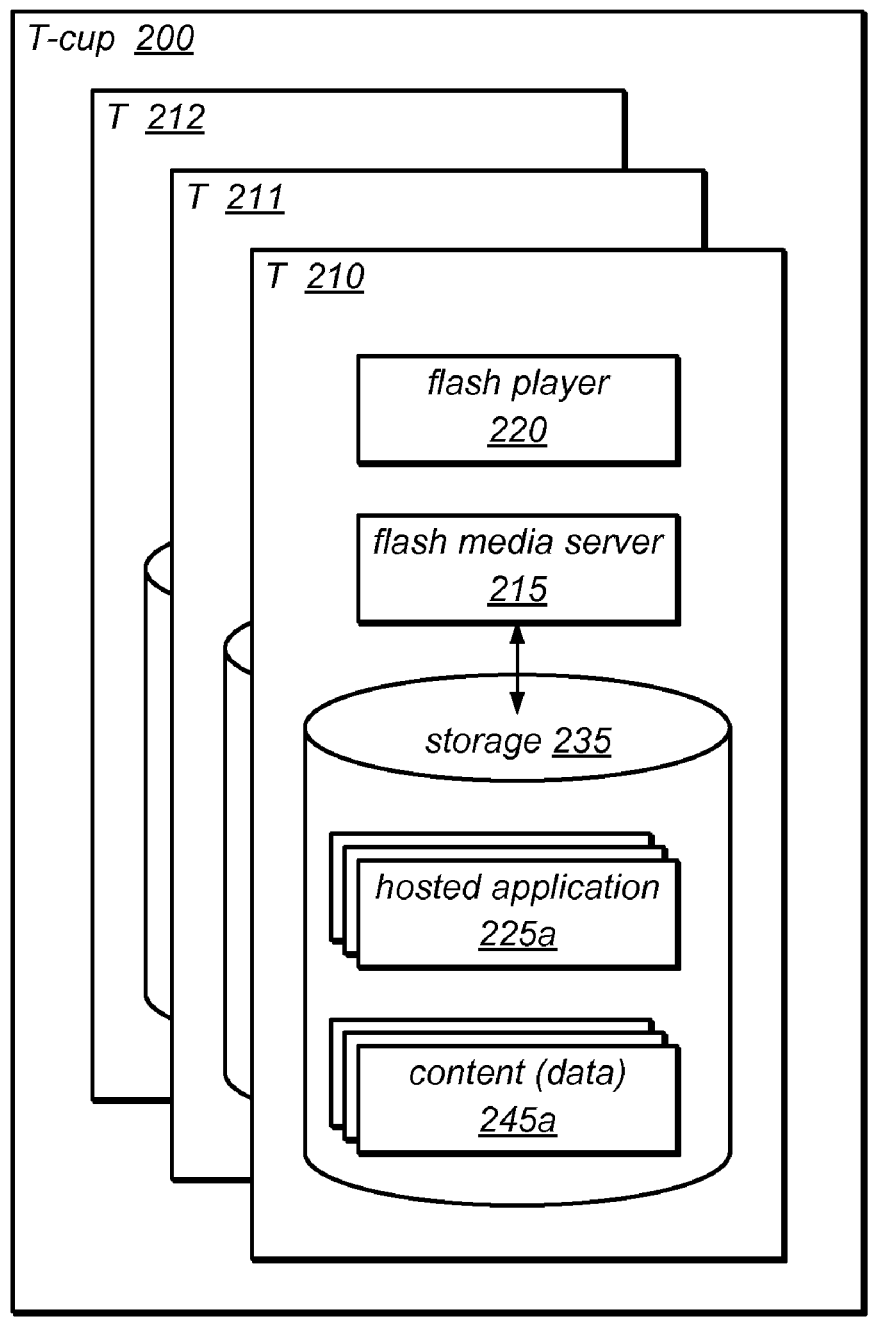
FIG. 2 is a block diagram illustrating various components of a T-cup, according to some embodiments.

The T-cups and Ts of the systems described herein may be further illustrated by the block diagram in FIG. 2, according to one embodiment. In this example, a T-cup instance 200 hosts three Ts, shown as 210, 211, and 212. In this example, T 210 includes a flash player 220, which may serve as a viewer and/or interface to T 210 and, as described above, may establish a connection with the corresponding flash media server 215 of T 210. The flash media server 215 may serve one or more hosted applications 225 (e.g., in the form of Flash® executables, or SWFs) and/or other assets (e.g., content 245) when requested from clients. As described above, hosted applications 225 and content 245 may reside in local storage 235, which in some embodiments may comprise a logical storage space mapped to a portion of the physical storage on the device on which T-cup 200 and T-210 have been instantiated.

As described above, the system and methods for providing a Personal Cloud may designed so that every T has one and only one owner (the ownership being propagated to the T from the user that invokes the instance of T-cup that hosts the T). In such embodiments, the owner may be uniquely identified within the network by the T itself, and there may be no need to maintain a central list of usernames and passwords. The equivocation between a T and a user may be advantageous in embodiments that take advantage of authentication through ownership.

The user of a physical device that invokes the T-cup application may be recognized by T-cup as the owner of all Ts local to that T-cup. This owner permission may in some embodiments be propagated to every T that is accessed through T-cup.

In some embodiments, the switchboard may be an Internet-hosted T name server that authenticates Ts, defines T ownership, and establishes friend-to-friend networks between Ts. The switchboard may maintain a master list of all Ts that have been created, either at manufacturing time or after-market, within a T-cup. In some embodiments, the master list may be indexed by the T IDs of the Ts. When a T-cup launches, it may register all local Ts (using their T IDs) with the switchboard. This registration process may involve the T-cup dynamically generating a T ID for each T, typically based on the T instantiation and a characteristic of the physical device on which T-cup executing, as described above. The T-cup may verify that this identifier matches the corresponding T ID, and if so, may transmit the T ID and location information of the T (e.g. its IP address) to the switchboard. When the switchboard receives a registration requests from a T-cup, it may store the location information of the Ts in its database, with the corresponding T identifiers.

In some embodiments, the switchboard may introduce the T-cup to all remote Ts that share the same owner as the local Ts. When a T wants to interoperate with another T, the Ts may be introduced to one another by the switchboard through a mutual, opt-in process. This process may include the switchboard providing enough information for the two Ts to establish a friend-to-friend network, where communication happens directly between the peers. In some embodiments, a T-cup may discover any Ts on the local subnet of their network that have yet to be claimed by another owner. The T-cup may give the user full owner privileges over visible, unclaimed Ts, as well as the option to claim ownership of them, in some embodiments. In other words, in various embodiments, a T-cup may enable its owner to administer all of his or her Ts, both local and remote, as well as any accessible, unclaimed Ts.

In some embodiments, on the switchboard, devices may either be claimed or unclaimed. If a device is claimed, it may be associated with an ownership group maintained on the switchboard. All Ts within an ownership group may be recognized by the switchboard as having the same owner. When a T-cup registers a T that it is hosting on a physical device, and the T is claimed, the switchboard may return the locations and identities of all of the Ts in the corresponding ownership group back to the T-cup. Subsequently, the T-cup may be able to give a user access to the Ts, whether they are local or remote.

A T that is unclaimed does not belong to an ownership group. In some embodiments, Ts may be unclaimed when they are first created. However, in some embodiments, a T may be claimed at some point during the manufacturing process. In some embodiments, a T-cup may give ownership privilege to all unclaimed Ts that are visible to the T-cup on the subnet of the local network. The T-cup may also enable a user to claim any of these unclaimed Ts. This is described in more detail below, with reference to FIG. 3. In some embodiments, a T-cup may also allows a user to unclaim any The or she owns. In such embodiments, the T-cup may send a request to the switchboard to relinquish a T with a given T ID. The switchboard may verify that the T is claimed and may remove the T from its ownership group. Subsequently, the switchboard may restore the state of that T to "unclaimed."

Figure 3:
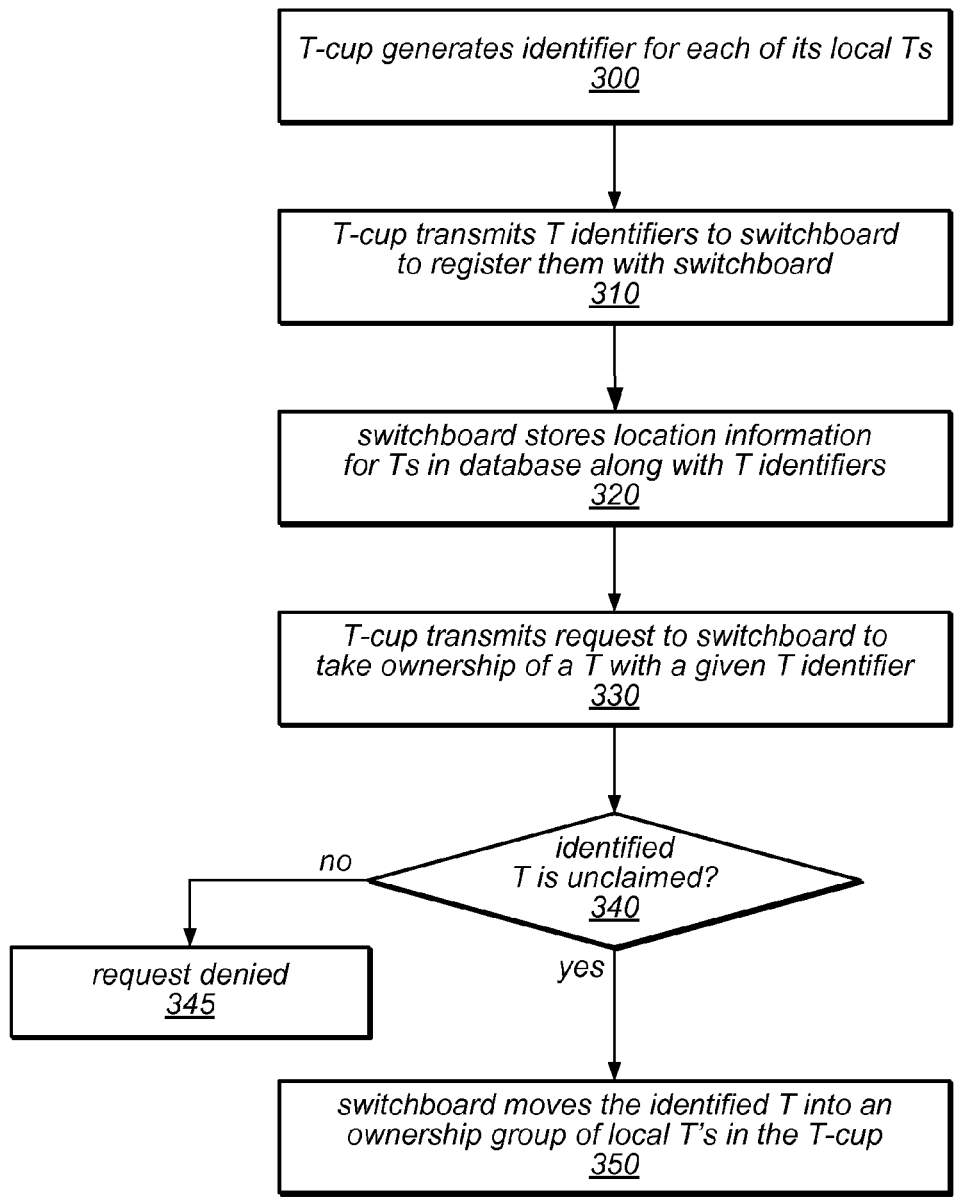
FIG. 3 is a flow diagram illustrating various operations of a Personal Cloud switchboard, according to some embodiments.

Various operations of a switchboard, as described herein, may be further illustrated by the flow diagram in FIG. 3. In this example, a T-cup instance may generate an identifier for each of its local Ts, as in 300. The T-cup may transmit these T identifiers to the switchboard to register them with the switchboard, as in 310. As described above, the switchboard may store location information for each T (e.g., an IP address of the device on which the T and corresponding T-cup are instantiated) in a database, and may associate this location information in the database with the transmitted T identifiers. This is shown as 320 in FIG. 3. In some embodiments, this location information may be subsequently used in establishing a direct communication channel between Ts.

As noted above, Ts may in some embodiments be unclaimed when they are first created. As shown in the example illustrated in FIG. 3, in some embodiments a T-cup may transmit a request to the switchboard to take ownership of an unclaimed T, as in 330. The request may include the identifier of the T. In this example, in response to this request the switchboard may determine whether the identified T is, in fact, unclaimed, as in 340. If not, shown as the negative exit from 340, the request may be denied, as in 345. It the switchboard verifies that the T ID does belong to an unclaimed T, shown as the positive exit from 340, the switchboard may move the identified T into the ownership group associated with the local Ts in the requesting T-cup, as in 350.

Ts that are in the same ownership group may in some embodiments have access to each other with full ownership permissions through the corresponding T-cup. However, as described herein, Ts in different ownership groups may be constrained in how they interoperate. Specifically, a given T may only be allowed to execute privileged applications on a T that has identified the given T as a guest. In such embodiments, the switchboard may act as the matchmaker to introduce various Ts to one another.

Figure 4:
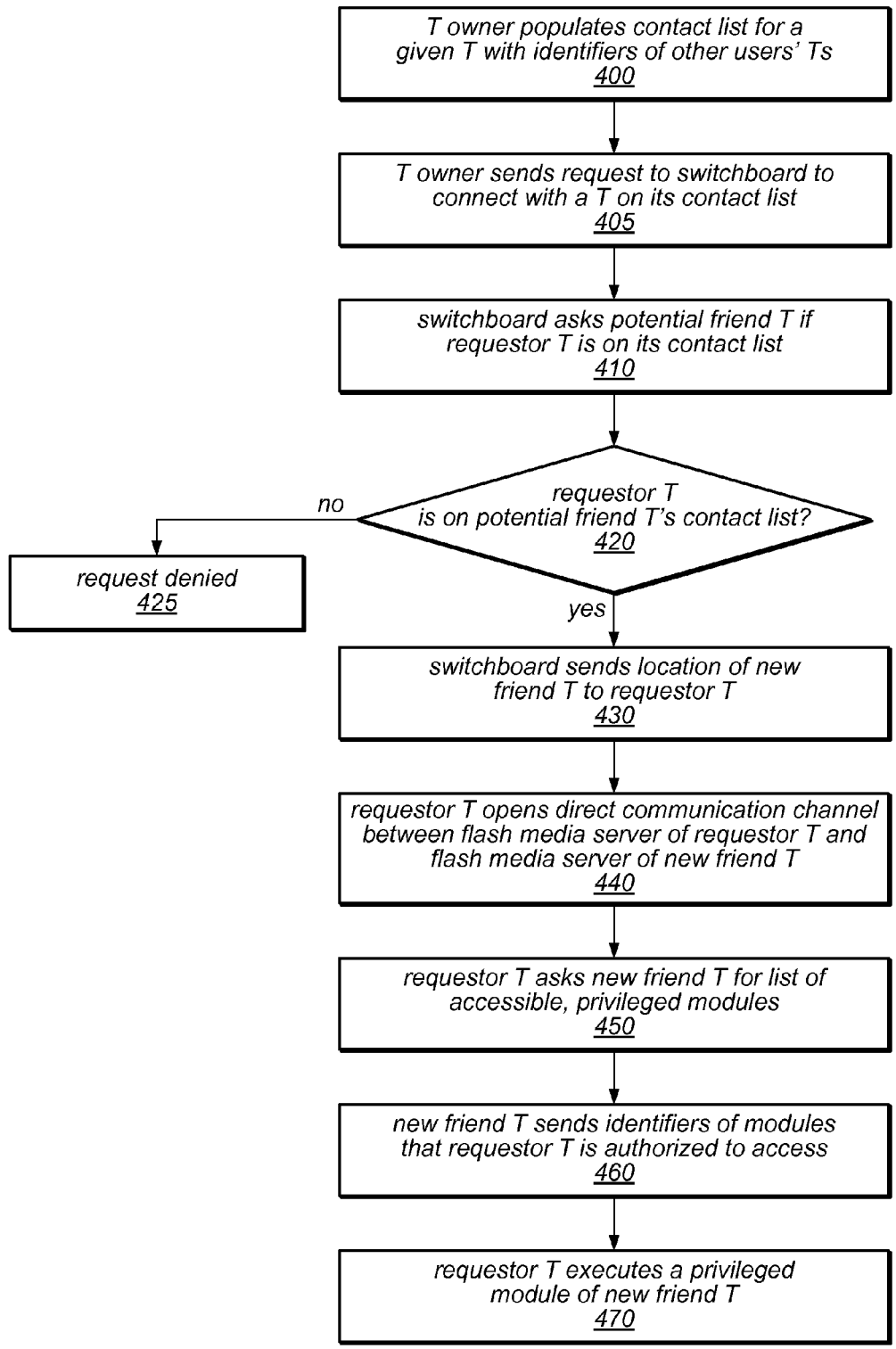
FIG. 4 is a flow diagram illustrating a method for establishing a relationship between various Ts, according to one embodiment.

One method for establishing a relationship between Ts is illustrated by the flow diagram in FIG. 4, according to one embodiment. In this example, the method includes a T owner populating the list of contacts on a given T with the identifiers of Ts owned by users to whom they would like to extend guest privileges, as in 400. In this example, a T owner may then send a request to the switchboard to connect with one of the Ts in its contacts list, as in 405. In this example, the method may include, in response to receiving the request, the switchboard may ask the potential friend T if the requestor T is in the contact list of the potential friend T, as in 410. If not, shown as the negative exit from 420, the switchboard may inform the requestor T that a connection with the potential friend has been denied, as in 425. If the requestor T is on the contact list of the potential friend, shown as the positive exit from 420, the switchboard may recognize the two Ts as friends, and may send the location of the friend T to the requestor T, as in 430.

In some embodiments, once a T has informed by the switchboard of the location of a friend T, it may be able to open a direct channel of communication to the new friend T, as in 440. In some embodiments, this direct communication channel may be established between the flash media server of the requestor T and the flash media server of the new friend T. In this example, once this direct communication channel has been opened, the requestor T may be able to ask, over this channel, for a list of accessible, privileged modules on the new friend T, as in 450. As shown in this example, in response, the new friend T may send to the requestor T identifiers of all privileged modules that the requestor T is authorized to access (i.e. all modules that contain the requestor T in their white list), as in 460. In this example, the requestor T may then execute any of these privileged modules of the new friend T at its own discretion, as in 470. Note that, as in this example, in some embodiments, once a requestor T and a friend T have established a direct communication channel, the interaction performed to request and receive access to privileged modules may be performed entirely between the new friends (i.e. friend T-to-friend T), without further involvement on the part of the switchboard.

While the example illustrated in FIG. 4 includes a request to connect with a single potential friend T, in some embodiments, a given T may be able to request to connect with all of the Ts in its contacts list. In such embodiments, the operations illustrated as 410-430 may be repeated for each of the Ts on the contact list (not shown). In other words, the switchboard may ask each potential friend T, in turn, if the requestor T is in its contact list, and if so, may send location information for each of a plurality of new friend Ts to the requestor T.

In some embodiments, authentication of an individual user may be based on a device that is (or can be) always in possession of that user. In some embodiments, by deploying the Personal Cloud as a portable application on this device, the user may extend their ownership privilege to any system on which the portable application executes. In such embodiments, a charm-like authentication device with a portable form of the software may be known, in the Personal Cloud solutions, as a key. For example, in the hub and spoke model described above, an owner's Iron may be considered the hub, and various keys may be considered the endpoints of the spokes. In various embodiments, a key may take the form of any device that presents itself as an external storage device, e.g., a CD-ROM, USB hard drive, or USB flash drive. In some embodiments, digital still cameras, MP3/MP4 players, digital photo frames, and similar peripheral devices may also be mounted as external storage and, by extension, may be used as keys.

In the limit, a key may be inseparable from its owner, and may act as a proxy for the owner's identity in the Personal Cloud friend-to-friend networks. There are times, however, when a user may want to semi-permanently identify a device as theirs in their own Personal Cloud. In some embodiments, the software stack may be installed on that device instead of deployed as a portable application. This may be known as a "soft key." A soft key may still employ authentication through ownership, where the authenticating device is the one on which the soft key is installed.

As an additional layer of security, a username and password may be added to authentication through ownership, in some embodiments. In other embodiments, a username and password may be the exclusive mechanism for authentication, as is common for hosted services today. An interesting middle ground may be for a third party to host a soft key for a user. Such a "hosted key" may in some embodiments be authenticated through a mechanism such as a username and password. But, once authenticated, it may act as a key for any other devices that the owner has permission to see.

As previously noted, the T operating environment may present its device as a single-user system. Because a T is a single-user system, the T owner may in some embodiments be uniquely identified by the corresponding T ID. Similarly, guests may also be identified by the T IDs of the devices they own. As a result, there may be no need to maintain any global database of personal information, such as unique usernames and passwords, to act as a means of identification. Therefore, in some embodiments, users may remain entirely anonymous to the Personal Cloud infrastructure. In such embodiments, the only times users may need to identify themselves may be when they must be identified, for example, to execute a financial transaction. In such cases, the personal information may be used exclusively for the transaction, and not as a means to identify users within the Personal Cloud infrastructure itself.

In some embodiments, users (i.e. people) may be associated with T IDs by individual T owners in their own private list of contacts. Such a list of contacts may be maintained on every T, and it may be the responsibility of the T owners to ensure that contact lists are synchronized, as desired, across all of the Ts that they own, in some embodiments. In some embodiments, T IDs may be exchanged between users in person, through email, or by some other form of interpersonal communication. As previously noted, the T operating environment may use the T IDs in the contacts list to establish friend-to-friend networks. In some embodiments, peer communication between Ts may be established if and only if the Ts appear in each other's contacts lists. For example, if the ID of T "A" is in the contacts list of T "B" but the ID of "B" is not in the contact list of "A", then the two devices will fail to establish a friend network, and no information may be allowed to pass between the two. In general, friend-to-friend networks may be created through a mutual opt-in process enforced by the operating environments.

In some embodiments, all modules, whether they are core, user, or privileged modules, may be rendered on their local T or served by the operating environment to be rendered on remote Ts. However, even when a module is rendered on a remote T, it may still be executing on the T from which it originated. In general, when a module launches another one, the new module executes on the T on which it resides. This may be true even for the case when a module invokes the root service of another T.

In some embodiments, the operating environment may enforce the execution permissions of all modules (e.g., core, user, and privileged modules) on a T. For example, the operating environment may be responsible for ensuring that core modules are only executed by the owner of a T. Similarly, privileged modules may only be executed by the owner of the T or guests that are explicitly identified in the white list of the privileged module. In some embodiments, the operating environment may restrict the features of the modules based on their type (such as a user module not being able to edit content directly), independent of the user.

The operating environment may in some embodiments be responsible for enforcing another execution characteristic of a module, i.e. its lock state. In such embodiments, if a module is locked, its file system instance may only be read by the application or service under which it is being controlled. An unlocked module, on the other hand, may have a file system instance that can be both read and modified. In some embodiments, the lock state of a module may only be modified by a core application. In such embodiments, it may be the responsibility of the operating environment to prevent changes to the file system instance of an application when it is locked, regardless of the user.

Figure 5:
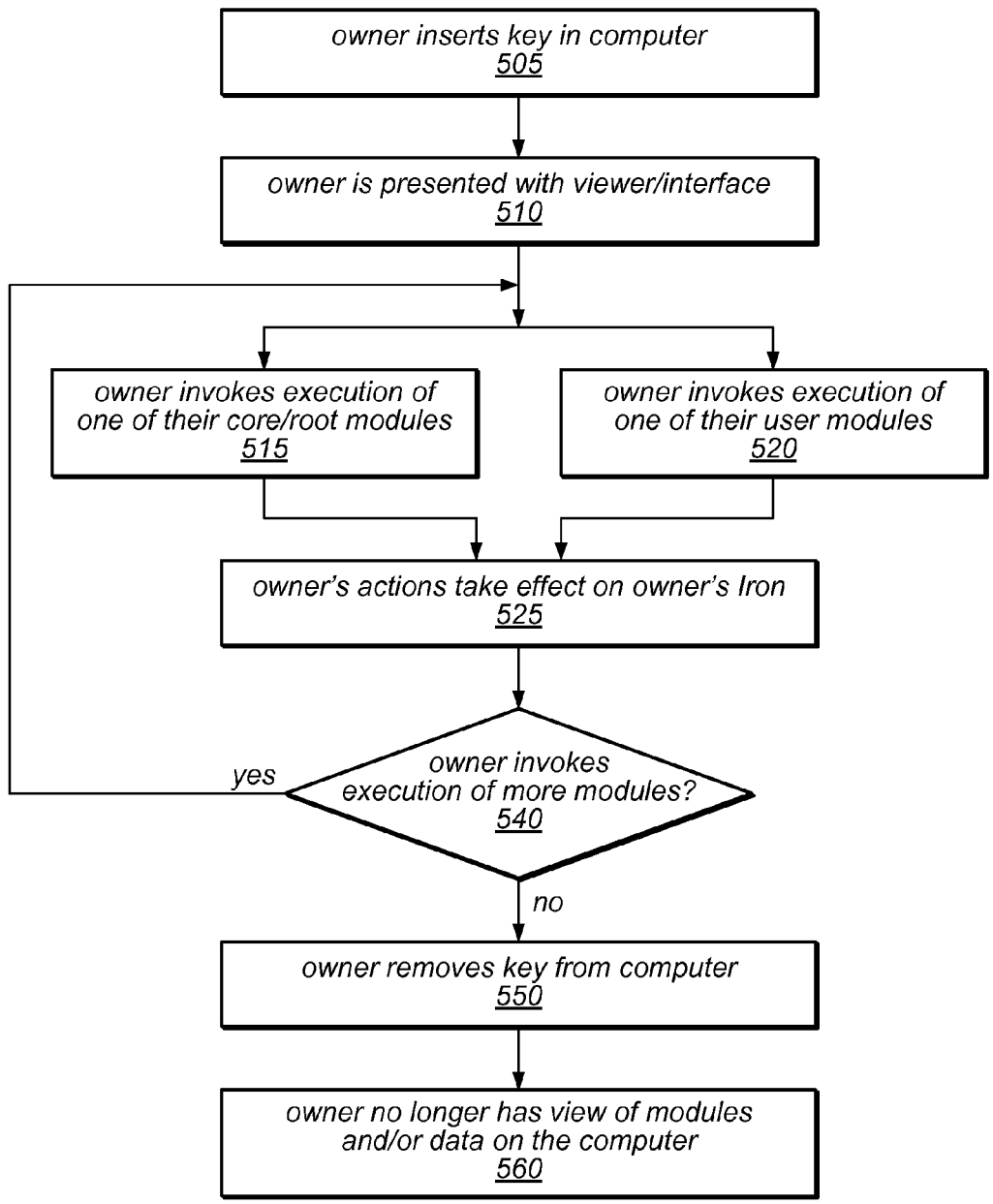
FIG. 5 is a flow diagram illustrating a method for a T owner in a Personal Cloud to execute one of his or her own modules.

The operations of the various components of a system providing a Personal Cloud may be further illustrated by way of example. FIGS. 5-8 illustrate the operation and use of the system and methods described herein, according to various embodiments. For example, FIG. 5 illustrates a method for an owner in a Personal Cloud to execute one of the owner's own modules. In this example, the method includes the owner inserting an owner's key in a computer, as in 505. For example, the owner may insert a USB drive serving as an owner key into the owner's own computer, or may attach a digital camera serving as an owner's key to another computer connected to the Internet. The owner's key may include a portable T-cup instance, as described above. As illustrated in 510 of FIG. 5, in response to the owner's key being inserted in the computer, the owner may be presented with a viewer or other interface with which to interact with the owner's Iron (e.g., a viewer/interface of the portable T-cup instance invoked in response to inserting the owner's key into the Internet café computer).

As illustrated in FIG. 5, through the viewer/interface, the owner may invoke execution of a core/root module for which it has ownership, as in 515, or may invoke execution of one of the owner's owned user modules, as in 520. As described herein, these modules may be executed on, and take effect on, the owner's Iron, as in 525. For example, the owner may plug a digital camera serving as an owner key into a computer in an Internet café, and may be able to access core modules (including the root module) to make administrative changes on the owner's Iron, which is sitting at home (e.g., to define spaces, add or remove contacts, push applications and/or data into various spaces so that they are accessible to those on the corresponding white lists, remove applications and/or data from various spaces, create or destroy Ts, etc.) The core module(s) would be executed on the owner's Iron, and any changes to the configuration of the owner's Iron would take effect on the Iron itself. These changes may be reflected to the owner in the viewer/interface presented to the owner by the portable T-cup instance that was invoked by inserting the owner's key on the Internet café computer. In another example, the owner may plug the owner's key into a computer at work to run one or more photo sharing applications (e.g., to create or modify a photo book or slideshow, to add photos, etc.). In this example, these photo sharing applications would be executed on the owner's Iron and any modifications to the owner's managed content (e.g., the owner's file system storing photos) would take effect on the Iron itself. These changes may be reflected to the owner in the viewer/interface presented to the owner, as described above. In yet another example, the owner may plug the owner's key into the owner's personal computer at home, and may access core and/or user applications on the owner's Iron through the owner's personal computer.

In this example, as long as the owner's key is inserted in the computer, the owner may invoke various modules that the owner owns, and the method may include executing those modules on the owner's Iron, having them take effect on the owner's Iron, and having them reflected on the computer into which the owner's key is inserted. This is illustrated in FIG. 5 as 540 and the feedback loop from the positive exit from 540 to 515 and 520. In this example, the method may include the owner removing the owner's key from the computer, as in 550. At this point, the owner may no longer have view into the modules and/or data of the owner's Iron, as shown in 560. For example, in some embodiments, in response to the owner removing the owner's key, the executable of the portable T-cup and any temporary local storage allocated to the viewer/interface or data for the T-cup or modules thereof on the computer into which the owner's key was inserted may be removed from that computer.

Figure 6:
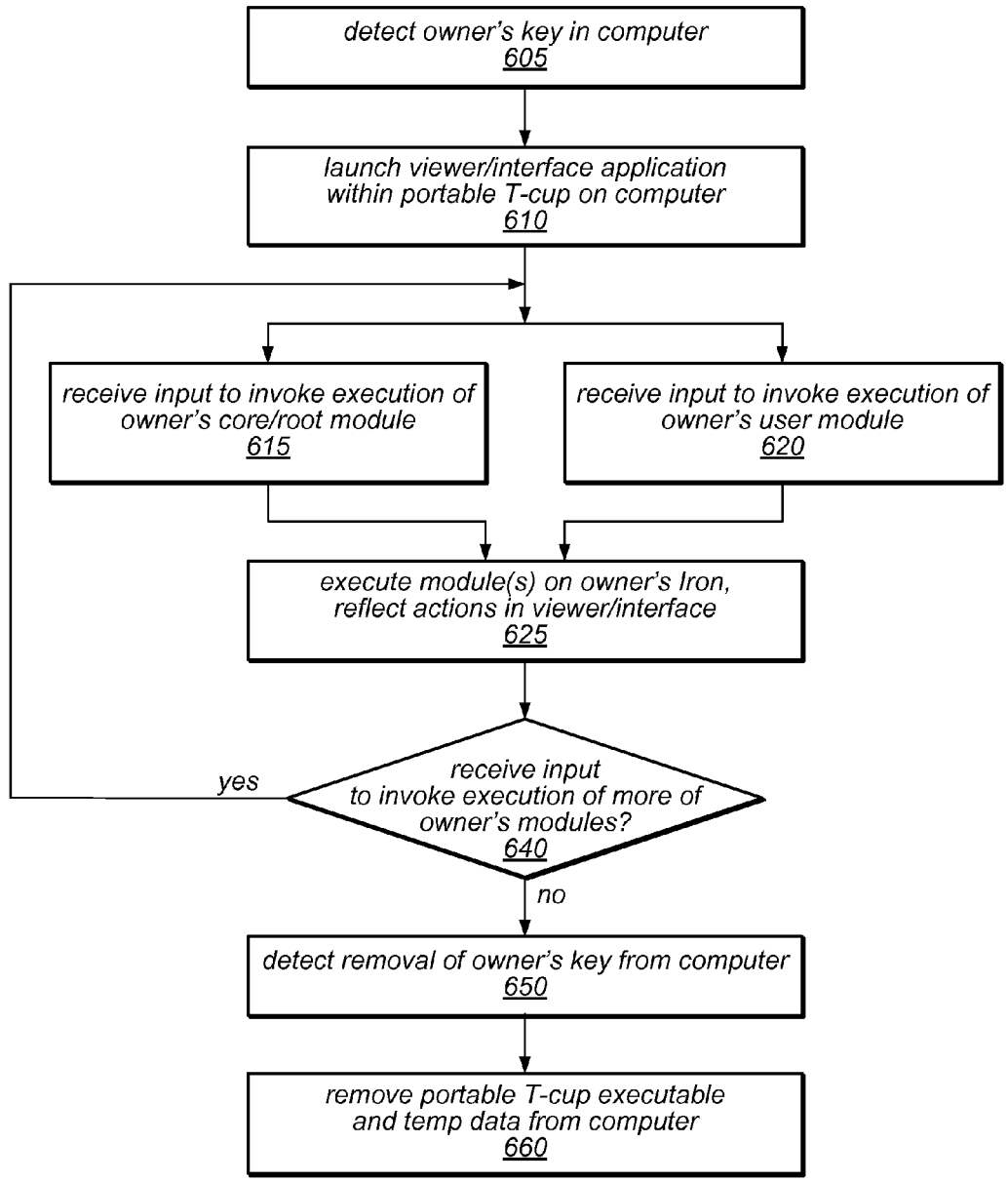
FIG. 6 is a flow diagram illustrating a method for using a computer to execute modules of a Personal Cloud on behalf of an owner of those modules, according to one embodiment.

FIG. 6 illustrates a method for using a computer to execute modules of a Personal Cloud on behalf of an owner of those modules, according to one embodiment. In this example, the method includes detecting the owner's key in the computer, as in 605. As in the previous example, the owner's own computer may detect that the owner has inserted a USB drive serving as an owner key into the computer, or a computer connected to the Internet may detect that the owner has attached a digital camera serving as an owner key to the computer. As illustrated in 610 of FIG. 6, in response to the owner's key being inserted in the computer, the computer may launch a viewer or other interface through which the owner may interact with the owner's Iron. For example, in one embodiment, the computer may execute a portable T-cup instance of the owner's key in response to detecting the owner's key being inserted into the computer, and the T-cup may launch a viewer/interface application of a T within the portable T-cup.

As illustrated in FIG. 6, the method may include the computer receiving, through the viewer/interface, input to invoke execution of a core/root module for which the owner has ownership, as in 615, or input to invoke execution of one of the owner's owned user modules, as in 620. As described in the example above, these modules may be executed on, and take effect on, the owner's Iron, as in 625. For example, a T of the owner key's portable T-cup may establish a communication channel with the T of the owner's Iron that includes an invoked application, and may invoke the execution of that application on the owner's Iron. Any outputs of the application and/or changes to the configuration of the owner's Iron and/or any managed data on the owner's Iron may be reflected to the owner in the viewer/interface presented to the owner, as described above.

In this example, the computer may continue to receive input from the owner to invoke various modules that the owner owns, as long as the owner's key is inserted in the computer, shown as 640 and the feedback loop from the positive exit from 640 to 615 and 620. As in the previous example, the method may include the computer executing those modules on the owner's Iron, and reflecting any changes on the computer. In this example, the method may include the computer detecting the removal of the owner's key from the computer, as in 650. In this example, in response to detecting the removal of the owner's key, the method may include the computer removing the executable of the portable T-cup and any temporary local storage allocated to the viewer/interface or data for the T-cup or modules thereof on the computer, as in 660.

Figure 7:
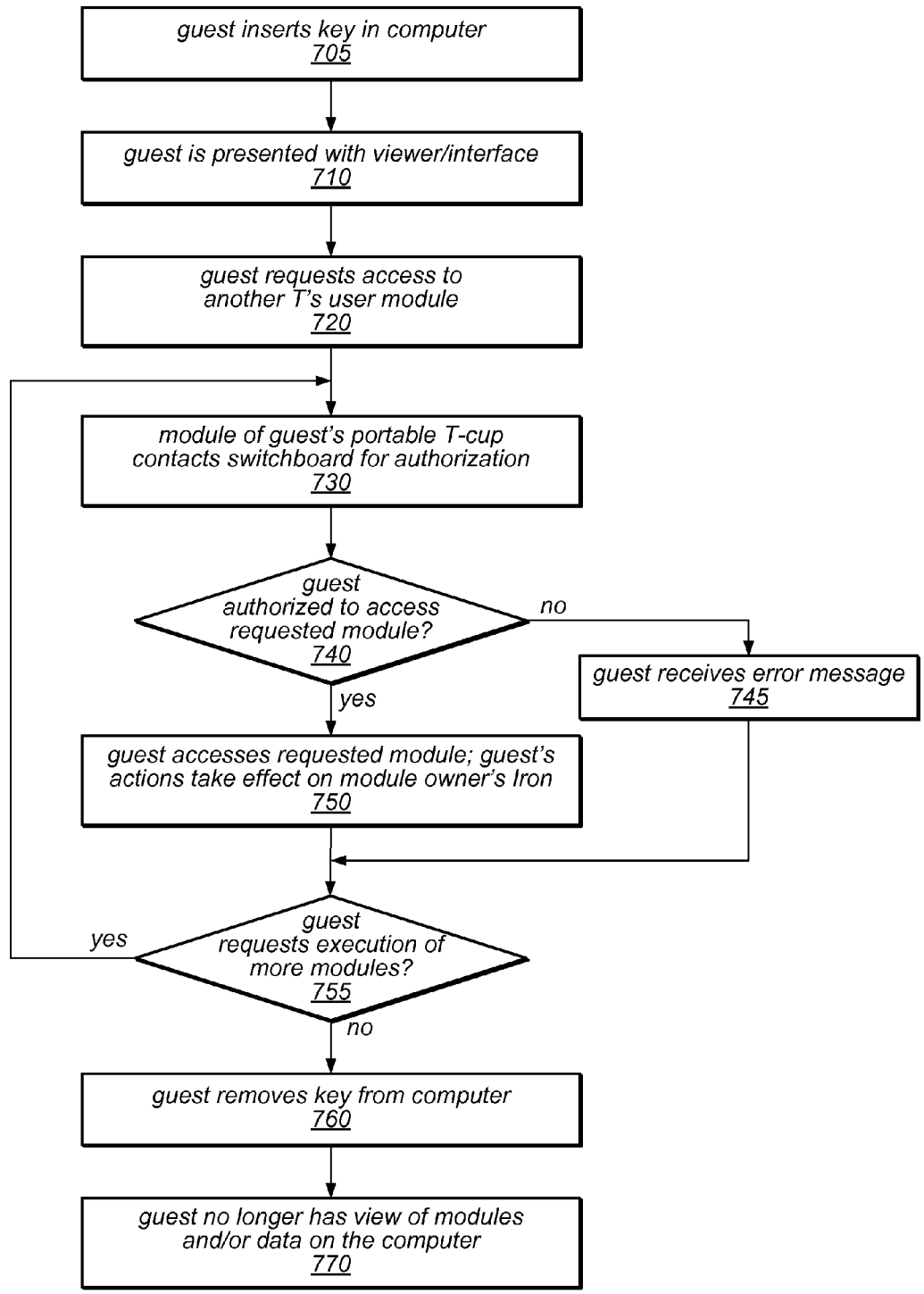
FIG. 7 is a flow diagram illustrating one embodiment of a method for a guest in a Personal Cloud to execute a module owned by another user.

FIG. 7 illustrates one embodiment of a method for a guest in a Personal Cloud to execute a module of another owner. In this example, the method includes the guest inserting a guest key in a computer, as in 705. For example, the guest may insert a USB drive serving as a guest key into the guest's own computer, or may attach a digital camera serving as a guest key to another computer connected to the Internet. The guest key may include a portable T-cup instance, as described above. As illustrated in 710 of FIG. 7, in response to the guest key being inserted in the computer, the method may include the guest being presented with a viewer or other interface with which to interact with the other owner's Iron (e.g., a viewer/ interface of the portable T-cup instance invoked in response to inserting the guest key into the Internet café computer).

As illustrated in FIG. 7, the method may include the guest requesting access to a user module (e.g., a hosted application and/or managed file system) owned by another owner through the viewer/interface, as in 720. As described herein, in some embodiments, a guest may not have (or be granted) access to a core or root module of another owner. In this example, in response to the guest requesting access to the user module of another owner, the method may include a module of the guest's portable T-cup contacting the switchboard for authorization, as in 730. As described herein, the switchboard may maintain a database of T identifiers, registered modules of each T, ownership groups, defined spaces, and/or contact lists, any or all of which may be used to determine which, if any, other users are authorized to access various user modules owned by a particular owner. If the guest is not authorized to access the requested module, shown as 740 and the negative exit from 740, the method may include the guest receiving an error message indicating that access to the requested module was denied, as in 745.

In this example, if the guest is authorized to access the requested module, shown as 740 and the positive exit from 740, the method may include the guest accessing the requested user module, and any actions performed by the guest when accessing the user module taking effect on the module owner's Iron, as in 750. For example, the guest may plug a digital camera serving as a guest key into a computer in an Internet café, and may be able to access one or more photo sharing applications on the other owner's Iron (e.g., to create, modify, or view a photo book or slideshow, to add photos, etc.). In this example, these photo sharing applications would be executed on the owner's Iron and any modifications to the owner's managed content (e.g., the owner's file system storing photos) would take effect on the Iron itself. These changes may be reflected to the guest in the viewer/interface presented to the guest, as described above.

In this example, as long as the guest key is inserted in the computer, the guest may request access to various modules of one or more other owners, and the method may include verifying that the guest is authorized to access the modules, executing those modules on the respective owner's Iron, having them take effect on the respective owner's Iron, and having them reflected on the computer into which the guest key is inserted. This is illustrated in FIG. 7 as 755 and the feedback loop from the positive exit from 755 to 730. In this example, the method may include the guest removing the guest key from the computer, as in 760. At this point, the guest may no longer have view into the modules and/or data of any other owner's Iron, as shown in 770. For example, in some embodiments, in response to the guest removing the guest key, the executable of the portable T-cup and any temporary local storage allocated to the viewer/interface or data for the T-cup or modules thereof on the computer into which the guest key was inserted may be removed from that computer.

Figure 8:
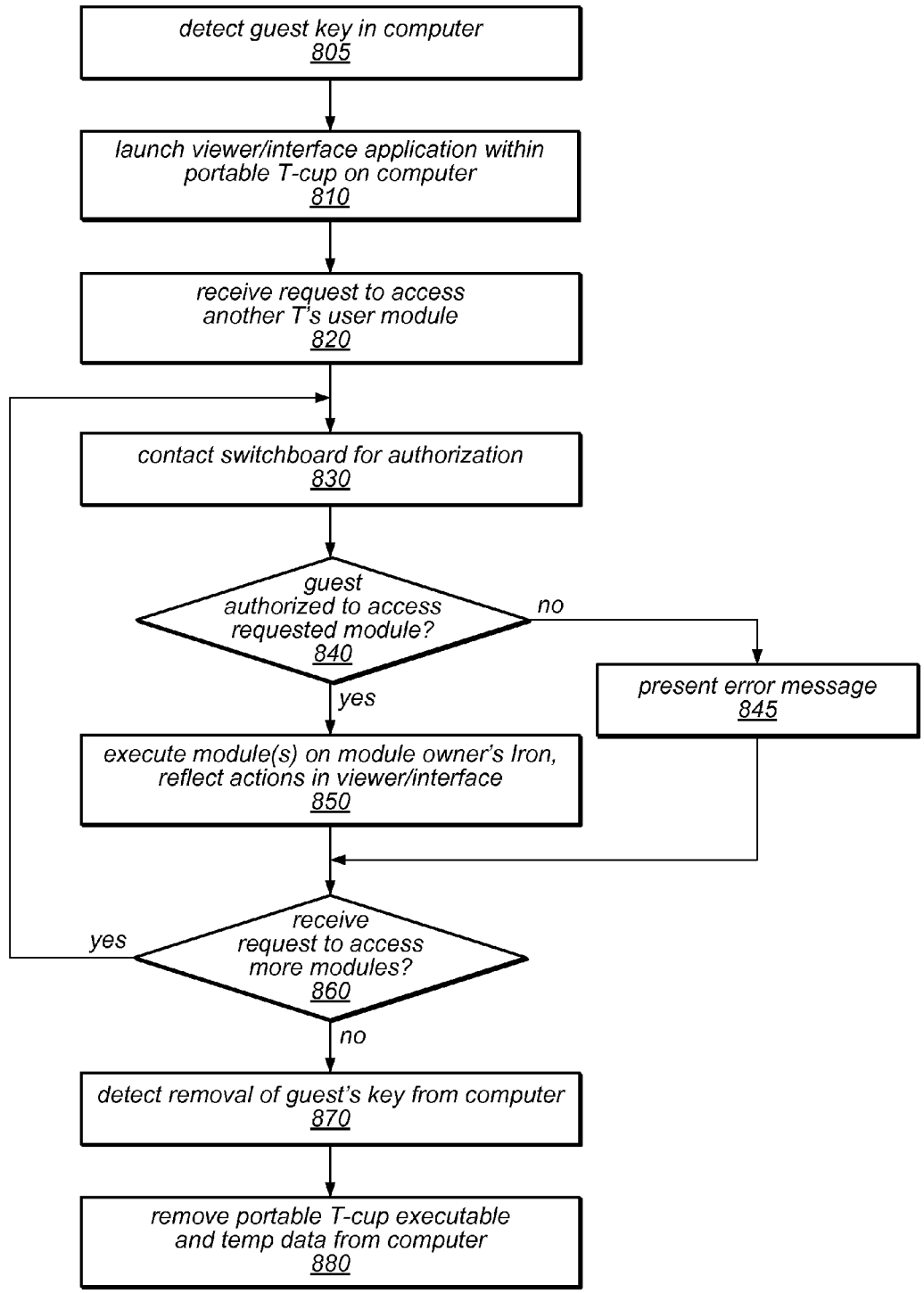
FIG. 8 is a flow diagram illustrating one embodiment of a method for using a computer to execute modules of a Personal Cloud on behalf of guest user.

FIG. 8 illustrates a method for using a computer to execute modules of a Personal Cloud on behalf of guest user, according to one embodiment. In this example, the method includes detecting the guest's key in the computer, as in 805. For example, the guest's own computer may detect that the guest has inserted a USB drive serving as a guest key into the computer, or a computer connected to the Internet may detect that the guest has attached a digital camera serving as a guest key to the computer. As illustrated in 810 of FIG. 8, in response to the guest key being inserted in the computer, the computer may launch a viewer or other interface through which the guest may interact with another owner's Iron. For example, in one embodiment, the computer may execute a portable T-cup instance of the guest key in response to detecting the guest key being inserted into the computer, and the T-cup may launch a viewer/interface application of a T within the portable T-cup.

As illustrated in FIG. 8, the method may include the computer receiving, through the viewer/interface, input to request access to a user module owned by another T, as in 820. As described herein, in some embodiments, a guest may not have (or be granted) access to a core or root module of another owner. In this example, in response to the guest requesting access to the user module of another owner, the method may include the computer (e.g., though a module of the guest's portable T-cup) contacting the switchboard for authorization, as in 830. As described herein, the switchboard may maintain a database of T identifiers, registered modules of each T, ownership groups, defined spaces, and/or contact lists, any or all of which may be used to determine which, if any, other users are authorized to access various user modules owned by a particular owner. If the guest is not authorized to access the requested module, shown as 840 and the negative exit from 840, the method may include the computer presenting the guest with an error message indicating that access to the requested module was denied, as in 845.

In this example, if the guest is authorized to access the requested module, shown as 840 and the positive exit from 840, the method may include the computer invoking execution of the requested user module on the owner's Iron, as in 850. As in the previous examples, any outputs of the application and/or changes to any managed data on the owner's Iron as a result of the guest's actions may be reflected to the guest in the viewer/interface presented to the guest, as described above.

In this example, the computer may continue to receive input from the guest requesting access to various modules owned by other owners, as long as the guest key is inserted in the computer, shown as 860 and the feedback loop from the positive exit from 860 to 830. As in the previous example, the method may include the computer executing those modules on the respective owner's Iron, and reflecting any changes to the guest on the computer. In this example, the method may include the computer detecting the removal of the guest key from the computer, as in 870. In this example, in response to detecting the removal of the guest key, the method may include the computer removing the executable of the portable T-cup and any temporary local storage allocated to the viewer/interface or data for the T-cup or modules thereof on the computer, as in 880.

As previously noted, various devices that may be mounted as external storage may be treated as keys for purposes of accessing a Personal Cloud. For example, one option for providing access to friends and family may be a digital photo frame configured as a guest key. Instead of using a device such a USB flash drive, such a frame may in some embodiments directly access and display content from an Iron. Such a frame may be suitable mechanism for non-technical users to participate in the Iron environment, minimizing the involvement of the PC.

In another example, a camera dedicated to children, may act as a key to an Iron just as any other USB mass storage device. In some embodiments, parents may create spaces on an Iron that act as a sandbox for a child, separating the photos taken by the child from photos taken by the parents. Photos captured on the camera may seamlessly interoperate with only the appropriate spaces on the Iron, giving the child a chance to learn and grow in photography.

In some embodiments, if a camera has sufficient local storage, it may also act as a private "Iron" (i.e. a peer in the Personal Cloud) for an owner or family member, with the full compliment of Iron applications maintained locally on the camera. In such embodiments, instead of uploading photos to a private space on the owner's Iron, the owner or family members may maintain their own spaces and invite others in (e.g., when the camera is connected through a PC to the network) to form a peer network. In some embodiments, this photo-centric implementation may be extended to a full social networking offering, as described in more detail below.

Netbooks, which package a CPU, a display, and a "working set" of data, typically operate together with high capacity storage packaged in another form to form a "virtual PC" that is assembled from multiple devices. In some embodiments, an Iron may serve for the external storage in such a system (e.g., in photo management). In one such embodiment, a netbook may be configured to handle all non-photo related tasks in a traditional model, but to obtain photo applications and data from the Iron. In some such embodiments, a soft key may be installed on the netbook, through which the netbook may access the Iron.

In some embodiments, the system described herein may allow an owner to backup the entire software stack of a Personal Cloud environment. For example, an entire T or T-cup may be copied or cloned, thus preserving the administrative state of the logical device, its context, lists of contacts, space definitions (e.g., white lists), hosted applications, hosted content, etc. In some embodiments, by cloning an entire logical device (T) in one snapshot (rather than using incremental backups), the cloned device may subsequently be hosted within the cloud just as any other device would be.

As previously note, a hub and spoke model of the Personal Cloud may be appropriate for solutions that require persistent, accessible information. Another common interaction model is one of ad hoc communication. In this model, a network may be established for a block of time, during which participants engage with one another, and then the network is torn down. A prime example of this form of communication is online gaming between friends. In various embodiments, the participants may use some kind of sideband communication (or polling) to determine if their friends are available, and if so, establish the network. These ad hoc networks may contain devices that live in the middle ground between an Iron and a key. In embodiments of the Personal Cloud solutions, such devices may be known as peers. As used herein, the term "peer" may refer to a device that is both necessary and sufficient to act both as a client and a server during an interactive session with one or more other peers. In such embodiments, a peer may bear a resemblance to both a soft key and a Soft Iron. This may be because Personal Cloud software stacks may be identical on all devices, including Irons and keys. The differences may arise only in the usage model (and applications that are served and consumed) for each of the devices. In various embodiments, a peer might be a PC, netbook, digital camera, mobile phone, or any of a number of devices. In various embodiments, keys and even Irons may act as peers, if desired by a user.

The system and methods described herein may be suitable for application to a wide variety of application spaces. For example, personal photo management may be well suited for the application of Personal Cloud computing, and a complete photo solution for the mass market may be based on an Iron, as described herein. The use of this solution may shift the primary location of a user's photos from the PC to an Iron. In some embodiments, this solution may comprise a suite of applications on the Iron that is necessary and sufficient to address all of the needs of users, from photo organization to creations (such as galleries, journals, and photo books), to sharing (e.g., through friend-to-friend networks, or spaces thereof). In some embodiments, the applications on the Iron may be accessed as hosted services, just like in the public cloud, but the Iron may remain in the possession of the user who owns the photos.

As noted above, another application that may be well suited to Personal Cloud computing may be a "Private Social Network." In various embodiments, a Private Social Network may be a social network whose infrastructure, data, and access are controlled by an individual user rather than by a third party. If the interaction groups are limited, and matchmaking is not needed (i.e. finding a long-lost high school friend), Private Social Networks may provide many of the benefits that are realized from "public" social networks, but may provide better control over those networks. In various embodiments, Private Social Networks may be hosted on an Iron, and may also be extended to peers that interact with one another directly. In various embodiments, a Private Social Network may serve as a vehicle to deliver any kind of application (e.g., from photo-centric applications to instant messaging, video chat, and even games). For example, spaces may be created within a personal network, and various applications and hosted content may be pushed into those spaces for access by the users/devices authorized to participate in those spaces (e.g., through their white lists). Such a controlled social networking environment may be especially valuable to particular classes of users. For instance, parents of children transitioning into the networked world may wish to have visibility and control of the online experiences of their children. By setting up the social network themselves, parents may ensure that children are interacting with trusted individuals in a safe environment. In various embodiments they may be able to predefine the applications available to their children and audit all of their activities.

Another possible application of Personal Cloud computing may be in education. For example, in some embodiments, an instructor may maintain an Iron in the classroom (possibly as a Soft Iron installed on a PC), which may act as a central repository for the classroom. Each student in the classroom may have his or her own key to portably move their activity from the classroom to the library to their home. In this example, the Iron may host applications that enable the instructor to best educate their students (e.g., using labs, homework, independent studies, or whatever makes sense for the class). In some embodiments, spaces may be defined for each class or subject into which the appropriate applications and data may be pushed. In some embodiments, this offering may be extended to allow the students to participate in their own Private Social Network, using the Iron and its applications as a vehicle to work collaboratively. In some embodiments, a key may be the least expensive entry into a full experience for students. In other embodiments, if a school had shared displays (e.g., netbooks) and an Iron (itself possibly hosted on a netbook), then each student may only need to have a USB flash drive to connect into an application suite coming from the Iron. In another example, MP4 players may be only marginally more costly than standard USB flash drives and may serve as a key just as well as any other device. In addition, they also support video out. Therefore, in some embodiments, if a child has access to a TV, they may be able to use applications hosted locally on an MP4 player to take their work home from the classroom.

Some embodiments of the system described herein may include a means for authenticating logical devices (Ts) and matchmaking between Ts within a Personal Cloud computing environment. For example, a name server module may authenticate Ts, define T ownership, and/or establish friend-to-friend networks between Ts, as described in detail herein. The name server module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform authenticating Ts, defining T ownership, and/or establishing friend-to-friend networks between Ts, as described in detail herein. Other embodiments of the name server module may be at least partially implemented by hardware circuitry and/or firmware stored, for example, in a non-volatile memory.

Some embodiments of the system described herein may include a means for creating, destroying, and/or hosting Ts on local, physical devices, and for administering Ts on both local and remote physical devices. For example, a virtual machine monitor module may create, destroy, and/or host Ts on local, physical devices, and may administer Ts on both local and remote physical devices, as described in detail herein. The virtual machine monitor module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform creating, destroying, and hosting Ts on local, physical devices, and administering Ts on both local and remote physical devices, as described in detail herein. Other embodiments of the virtual machine monitor module may be at least partially implemented by hardware circuitry and/or firmware stored, for example, in a non-volatile memory.

Some embodiments of the system described herein may include a means for encapsulating content, for serving and/or consuming applications and services. For example, a logical device module may encapsulate content, and may serve and/or consume applications and services (e.g., one or more application modules, a server module and an interface module), as described in detail herein. The logical device module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform encapsulating content, and serving and/or consuming applications and services (e.g., one or more application modules, a server module and an interface module), as described in detail herein. Other embodiments of the logical device module may be at least partially implemented by hardware circuitry and/or firmware stored, for example, in a non-volatile memory. In some embodiments, the hosted content and/or hosted applications of a logical device module may be resident in local storage allocated to an executable instance of the logical device module.

Some embodiments of the system described herein may include a means for hosting one or more application modules and/or hosted content. For example, a server module may host the one or more application modules and the hosted content, as described in detail herein. The server module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform hosting the one or more application modules and the hosted content, as described in detail herein. Other embodiments of the server module may be at least partially implemented by hardware circuitry and/or firmware stored, for example, in a non-volatile memory. In some embodiments, the server module may be a component of a logical device module, described above.

Some embodiments of the system described herein may include a means for providing access to one or more hosted application modules and/or hosted content in response to detecting an authorized key. For example, an interface module may provide access to the one or more application modules and/or hosted content in response to detecting an authorized key, as described in detail herein. The interface module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform providing access to the one or more application modules and/or hosted content in response to detecting an authorized key, as described in detail herein. Other embodiments of the virtual machine monitor module may be at least partially implemented by hardware circuitry and/or firmware stored, for example, in a non-volatile memory. In some embodiments, the interface module may be a component of a logical device module, described above.

Figure 9:
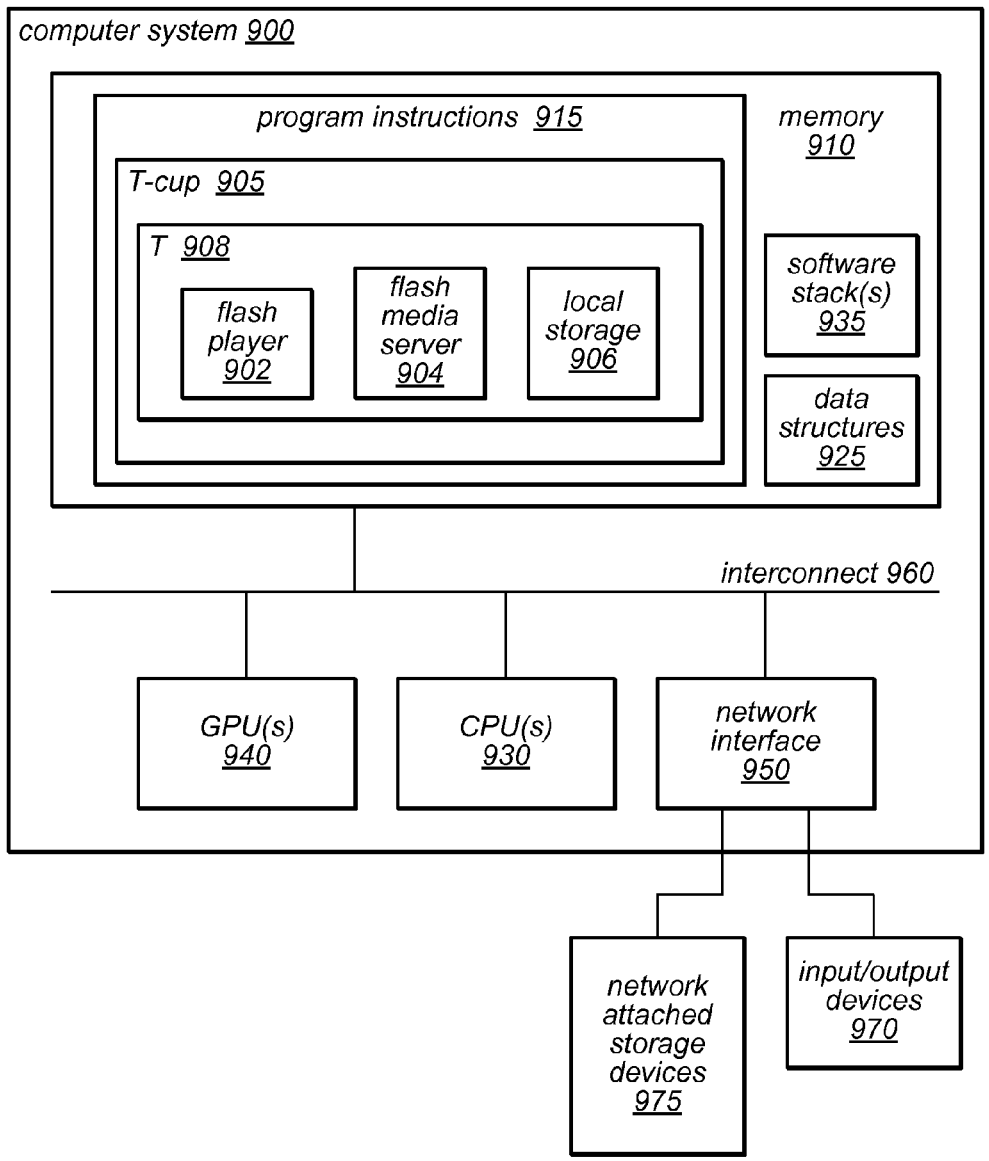
FIG. 9 illustrates a computer system configured to provide one or more components of a Personal Cloud, according to various embodiments.

The methods described herein for providing a Personal Cloud may in some embodiments be implemented by one or more computer systems configured to provide the functionality of a switchboard, a network attached storage device, a guest device, an owner's computer, a portable device, an owner key, a guest key, or other elements of the system described herein. FIG. 9 is a block diagram illustrating one embodiment of a computer system 900 configured to implement any or all of these components. Computer system 900 may be any of various types of devices, including, but not limited to, a personal computer system, desktop computer, laptop or notebook computer, mainframe computer system, handheld computer, workstation, network computer, a consumer device, video game console, handheld video game device, application server, storage device (e.g., a network attached storage device), peripheral device such as a switch, modem, or router, a digital still camera, an MP3/MP4 player, a digital photo frame, a digital video camera, a USB drive, a netbook, or in general any type of computing device.

As illustrated in FIG. 9, computer system 900 may include one or more processor units (CPUs) 930. Processors 930 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. In various embodiments, the methods disclosed herein for providing and/or accessing applications and/or managed data of a Personal Cloud may be implemented by program instructions configured for execution on one or more such CPUs. Any desired operating system(s) may be run on computer system 900, such as various versions of Unix, Linux, Windows™ from Microsoft Corporation, MacOS™ from Apple Corporation, or any other operating system that enables the operation of software on a hardware platform.

As illustrated in FIG. 9, computer system 900 may also include one or more graphics processing units (GPUs) 940. A GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, a GPU 940 may implement a number of graphics primitive operations in a way that makes executing them much faster than drawing directly to the screen with a host CPU, such as CPU 930. In various embodiments, one or more user modules (e.g., photo sharing or image editing applications) may be implemented by program instructions configured for parallel execution on two or more such GPUs. The GPU 940 may implement one or more application programmer interfaces (APIs) that permit programmers to invoke the functionality of the GPU. Suitable GPUs may be commercially available from vendors such as NVIDIA Corporation, ATI Technologies, and others.

GPUs, such as GPU 940 may be implemented in a number of different physical forms. For example, GPU 940 may take the form of a dedicated graphics card, an integrated graphics solution and/or a hybrid solution. GPU 940 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution may find itself competing for the already slow system RAM with the CPU, as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the GPUs 940 and the rest of the computer system 900 may travel through a graphics card slot or other interface, such as interconnect 960 of FIG. 9.

As illustrated in FIG. 9, computer system 900 may include one or more system memories 910 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 900 via interconnect 960. Memory 910 may include other types of memory as well, or combinations thereof. In the example illustrated in FIG. 9, memory 910 may represent any of various types and arrangements of memory, including general-purpose system RAM and/or dedication graphics or video memory.

One or more of memories 910 may include program instructions 915 executable by one or more of CPUs 930 and/or GPUs 940 to implement aspects of a Personal Cloud and/or the application and content hosting techniques described herein. Program instructions 915, which may include program instructions configured to implement one or more T-cup(s) 905, may be partly or fully resident within the memory 910 of computer system 900 at any point in time. Alternatively, program instructions 915 may be provided to GPU 940 for performing graphics operations on GPU 940. In some embodiments, the techniques described herein may be implemented by a combination of program instructions 915 executed on one or more CPUs 930 and one or more GPUs 940, respectively.

As illustrated in FIG. 9, each T-cup(s) 905 may comprise one or more Ts 908, each of which may include a flash player 902, a flash media server 904, and/or local storage 906. As described herein, local storage 906 may represent a logical portion of physical memory 910, and may include program instructions executable to implement one or more hosted applications, and/or managed (hosted) content, such as a managed file system and/or data associated with one or more of the hosted applications. Various ones of these hosted applications may be executable on one or more of CPUs 930 and/or GPUs 940 to cause computer system 900 to provide the functionality described herein, or the functionally of other hosted modules.

Program instructions 915 may be stored on an external storage device (not shown) accessible by CPUs 930 and/or GPUs 940, in some embodiments. Any of a variety of such storage devices may be used to store the program instructions 915 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the CPUs 930 and/or GPUs 940 through one or more storage or I/O interfaces including, but not limited to, interconnect 960 or network interface 950, as described herein. In some embodiments, the program instructions 915 may be provided to the computer system 900 via any suitable computer-readable storage medium including memory 910 and/or external storage devices described above.

As illustrated in FIG. 9, memory 910 may be configured to implement one or more data structures 925, such as one or more data structures configured to store data representing one or more input images, output images, or intermediate images for a graphics application, or other types of program data for other applications. As illustrated in FIG. 9, memory 910 may also include various software stacks 935. Data structures 925 and/or stacks 935 may be accessible by CPUs 930 and/or GPUs 940 when executing T-cup 905, T 908, flash player 902, flash media server 904, a hosted application of local storage 906, or other program instructions with program instructions 915, such as program instructions executable to implement a switchboard, as described herein.

In various embodiments, T-cup 905, T 908, flash player 902, flash media server 904, a hosted application of local storage 906, or other program instructions with program instructions 915 may be provided as a computer program product, or software, that may include a computer-readable storage medium having stored thereon instructions, which may be used to program a computer system (or other electronic devices) to implement various components of a Personal Cloud (e.g., T-cups, Ts, hosted applications, or switchboards), as described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums).

Program instructions 915 may be implemented in various embodiments using any desired programming language, scripting language, or combination of programming languages and/or scripting languages, e.g., C, C++, C#, Java™, Perl, etc. For example, in one embodiment, T-cup 905, T 908, flash player 902, flash media server 904, a hosted application of local storage 906, or other program instructions with program instructions 915 may be JAVA based, while in another embodiments, they may be implemented using the C or C++ programming languages. In other embodiments, all or a portion of a hosted application of local storage 906 may be implemented using specific graphic languages specifically for developing programs executed by specialize graphics hardware, such as GPU 940. In addition, all or a portion of a hosted application of local storage 906 may be embodied on memory specifically allocated for use by GPUs 940, such as memory on a graphics board including GPUs 940. Thus, memory 910 may represent dedicated graphics memory as well as general-purpose system RAM, in various embodiments. Other information not described herein may be included in memory 910 and may be used to implement the methods described herein and/or other functionality of computer system 900.

Note that program instructions 915 may be configured to implement T-cup 905, T 908, flash player 902, flash media server 904, or a hosted application of local storage 906 as a stand-alone application, or as a module of another application, in various embodiments. For example, in one embodiment program instructions 915 may be configured to implement a collaborative application such as photo sharing, social networking, educational, and/or other applications.

As shown in FIG. 9, CPUs 930 and/or GPUs 940 may be coupled to one or more of the other illustrated components by at least one communications bus, such as interconnect 960 (e.g., a system bus, LDT, PCI, ISA, or other communication bus type), and a network interface 950 (e.g., an ATM interface, an Ethernet interface, a Frame Relay interface, or other interface). The CPUs 930, the GPUs 940, the network interface 950, and the memory 910 may be coupled to the interconnect 960. It should also be noted that one or more components of system 900 might be located remotely and accessed via a network.

Network interface 950 may be configured to enable computer system 900 to communicate with other computers, systems or machines, such as across a network. Network interface 950 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 900 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols.

The data exchanged over such a network by network interface 950 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 900 may also include one or more additional I/O interfaces, such as interfaces for one or more user input devices 970, one or more network attached storage devices 975 (e.g., network attached storage device implementing the functionality of an Iron, as described herein), or any other such devices may be coupled to computer system 900 via network interface 950. For example, computer system 900 may include interfaces to a keyboard, a mouse or other cursor control device, a joystick, or other user input devices 970, in various embodiments. Additionally, the computer system 900 may include one or more displays (not shown), coupled to processors 930 and/or other components via interconnect 960 or network interface 950. Such input/output devices may be configured to allow a user to interact with T-cup 905, T 908, flash player 902, flash media server 904, or a hosted application of local storage 906 to request various operations and/or to specify various parameters, thresholds, and/or other configurable options available to the user when executing T-cup 905, T 908, flash player 902, flash media server 904, or a hosted application of local storage 906. It will be apparent to those having ordinary skill in the art that computer system 900 may also include numerous other elements not shown in FIG. 9.

While various techniques for providing a Personal Cloud and/or corresponding application and content hosting techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow.

Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system comprising:
   one or more processors; and
   a memory coupled to the one or more processors and storing program instructions executable by the one or more processors to implement:
      a logical device; and
      a virtual machine monitor configured to create an executable instance of the logical device in the memory;
   wherein the executable instance of the logical device comprises:
      one or more application modules;
      a server module configured to host the one or more application modules; and
      an interface module configured to provide access to the one or more application modules during execution of the one or more application modules in response to detecting an authorized key.

2. The system of claim 1, wherein said detecting an authorized key comprises:
   detecting a storage device coupled to the system; and
   determining that a logical device instantiated in memory on the storage device is associated with a device identifier included on a list of device identifiers authorized to access the one or more application modules.

3. The system of claim 2,
   wherein said determining comprises communicating with a name server coupled to the system and configured to maintain the list of device identifiers to determine whether the logical device instantiated in memory on the storage device is associated with a device identifier included on the list of device identifiers.

4. The system of claim 2, wherein the storage device comprises one of: a computer system, a digital camera, a digital photo frame, a mobile phone, an audio player, a video player, an installed storage device, or a portable storage device.

5. The system of claim 2, wherein the storage device comprises a storage device belonging to an owner of the executable instance of the logical device.

6. The system of claim 2, wherein the storage device comprises a storage device belonging to a guest of an owner of the executable instance of the logical device.

7. The system of claim 2, wherein the logical device instantiated in memory on the storage device comprises:
   one or more other application modules;
   a second server module configured to host the one or more other application modules; and
   a second interface module configured to provide access to the one or more other application modules in response to detecting a key configured to enable access to the one or more other application modules.

8. The system of claim 1,
   wherein the executable instance of the logical device further comprises a list of contacts, each representing a logical device instantiated in the memory or instantiated in memory on a physical device coupled to the system; and
   wherein the executable instance of the logical device is configured to:
      send a request to connect to a second logical device represented on the list of contacts to a name server coupled to the system; and
      in response to receiving location information associated with the second logical device from the name server, establishing a direct communication channel between the server module and a server module of the second logical device.

9. The system of claim 1,
   wherein the executable instance of the logical device further comprises hosted content; and
   wherein the hosted content is accessible by one or more of the one or more hosted applications.

10. The system of claim 1, embodied in a network attached storage device.

11. A method, comprising:
    using a computer to perform:
       a virtual machine monitor creating an executable instance of a logical device in memory on the computer;
    wherein the executable instance of the logical device comprises:
       one or more application modules;
       a server module configured to host the one or more application modules; and
       an interface module configured to provide access to the one or more application modules during execution of the one or more application modules in response to detecting an authorized key.

12. The method of claim 11, wherein said detecting an authorized key comprises:
    detecting a storage device coupled to the computer; and
    determining that a logical device instantiated in memory on the storage device is associated with a device identifier included on a list of device identifiers authorized to access the one or more application modules.

13. The method of claim 12,
    wherein said determining comprises communicating with a name server coupled to the computer and configured to maintain the list of device identifiers to determine whether the logical device instantiated in memory on the storage device is associated with a device identifier included on the list of device identifiers.

14. The method of claim 12, wherein the storage device comprises a storage device belonging to an owner of the executable instance of the logical device.

15. The method of claim 12, wherein the storage device comprises a storage device belonging to a guest of an owner of the executable instance of the logical device.

16. The method of claim 11,
    wherein the executable instance of the logical device further comprises a list of contacts, each representing a logical device instantiated in the memory on the computer or instantiated in memory on a physical device coupled to the computer;
    the method further comprising:
       using the computer to perform:
          the executable instance of the logical device sending a request to connect to a second logical device represented on the list of contacts to a name server coupled to the computer; and in response to receiving location information associated with the second logical device from the name server, the executable instance of the logical device establishing a direct communication channel between the server module and a server module of the second logical device.

17. The method of claim 11,
wherein the executable instance of the logical device further comprises hosted content;
the method further comprising, using the computer to perform:
one of the one or more hosted applications accessing the hosted content.

18. A non-transitory computer-readable storage medium storing program instructions computer-executable to implement:
a logical device; and
a virtual machine monitor configured to create an executable instance of the logical device in a memory on the computer;
wherein the executable instance of the logical device comprises:
one or more application modules;
a server module configured to host the one or more application modules; and
an interface module configured to provide access to the one or more application modules during execution of the one or more application modules in response to detecting an authorized key.

19. The storage medium of claim 18, wherein said detecting an authorized key comprises:
detecting a storage device coupled to the computer; and
determining that a logical device instantiated in memory on the storage device is associated with a device identifier included on a list of device identifiers authorized to access the one or more application modules.

20. The storage medium of claim 19,
wherein said determining comprises communicating with a name server coupled to the computer and configured to maintain the list of device identifiers to determine whether the logical device instantiated in memory on the storage device is associated with a device identifier included on the list of device identifiers.

21. The storage medium of claim 19, wherein the storage device comprises a storage device belonging to an owner of the executable instance of the logical device.

22. The storage medium of claim 19, wherein the storage device comprises a storage device belonging to a guest of an owner of the executable instance of the logical device.

23. The storage medium of claim 18,
wherein the executable instance of the logical device further comprises a list of contacts, each representing a logical device instantiated in the memory on the computer or instantiated in memory on a physical device coupled to the computer; and
wherein the executable instance of the logical device is configured to:
send a request to connect to a second logical device represented on the list of contacts to a name server coupled to the computer; and
in response to receiving location information associated with the second logical device from the name server, establish a direct communication channel between the server module and a server module of the second logical device.

24. The storage medium of claim 18,
wherein the executable instance of the logical device further comprises hosted content; and
wherein the hosted content is accessible by the one or more hosted applications.

* * * * *